United States Patent
Borry

(10) Patent No.: US 9,848,530 B2
(45) Date of Patent: Dec. 26, 2017

(54) AGRICULTURAL HARVESTER CUTTER BAR WITH STATIONARY AND RECIPROCATING KNIFE SECTIONS

(71) Applicant: CNH Industrial America LLC, New Holland, PA (US)

(72) Inventor: Stijn Borry, Pittem (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/192,382

(22) Filed: Jun. 24, 2016

(65) Prior Publication Data
US 2016/0374265 A1   Dec. 29, 2016

(30) Foreign Application Priority Data
Jun. 24, 2015   (BE) .................................. 2015/5384

(51) Int. Cl.
| | | |
|---|---|---|
| A01D 34/13 | (2006.01) | |
| A01D 34/14 | (2006.01) | |
| A01D 34/135 | (2006.01) | |
| A01D 41/06 | (2006.01) | |
| A01D 57/02 | (2006.01) | |
| A01F 7/06 | (2006.01) | |
| A01D 101/00 | (2006.01) | |

(52) U.S. Cl.
CPC ............ *A01D 34/135* (2013.01); *A01D 34/14* (2013.01); *A01D 41/06* (2013.01); *A01D 57/02* (2013.01); *A01F 7/06* (2013.01); *A01D 2101/00* (2013.01)

(58) Field of Classification Search
CPC combination set(s) only.
See application file for complete search history.

(56) References Cited

U.S. PATENT DOCUMENTS

| | | | |
|---|---|---|---|
| 6,062,012 A * | 5/2000 | Suarez ................ | A01D 34/135 56/257 |
| 6,708,476 B1 | 3/2004 | Blakeslee et al. | |

FOREIGN PATENT DOCUMENTS

| | | | |
|---|---|---|---|
| DE | 1582437 A1 | 5/1970 | |
| DE | 20301750 U1 | 4/2003 | |
| DE | 102005025575 A1 | 12/2006 | |
| DE | 102014003493 A1 * | 9/2015 | ........... A01D 34/135 |
| EP | 1046332 A1 | 10/2000 | |
| JP | 2010161942 A | 7/2010 | |
| WO | 9210927 A1 | 7/1992 | |

\* cited by examiner

*Primary Examiner* — Alicia Torres
(74) *Attorney, Agent, or Firm* — Peter K. Zacharias

(57) ABSTRACT

A header for use by an agricultural harvester. The header includes a cutter bar that cuts crop material and includes a stationary knife section and a plurality of reciprocating knife sections extending along a portion of the stationary knife section. A substantial part of the length of the reciprocating knife sections do not extend along any portion of the stationary knife section.

23 Claims, 2 Drawing Sheets

AGRICULTURAL HARVESTER CUTTER BAR WITH STATIONARY AND RECIPROCATING KNIFE SECTIONS

CROSS REFERENCE TO RELATED APPLICATION

This application claims priority to Belgium Application No. 2015/5384, filed Jun. 24, 2015, the contents of which are incorporated herein by reference.

FIELD OF THE INVENTION

The present invention relates to agricultural harvesters, and, more specifically to the cutter bar of the header of agricultural harvesters.

BACKGROUND OF THE INVENTION

An agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger conveys the grain to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

The cutter bar of the header typically includes a reciprocating blade moving atop a bar on which there are mounted fingers with stationary guard plates. The reciprocating blade operates in a channel on the bar and has very sharp sickle sections (triangular blades). The reciprocating blade is driven back and forth along the channel. The plant matter, is cut between the sharp edges of the sickle sections and the finger guard plates.

In DE 203 01 750 (Koeppl) there is disclosed a bar mower, having cutting devices that are divided into halves (FIGS. 1-8) where the mowing bar works with a serrated upper and lower blade, the upper blade being a divided upper blade (2), whose halves (2a, 2b) are simultaneously moved to the sides and back in order to cut the grass. A pulling and a pushing rod are joined to two twin armed levers connected to a linear drive with their opposite ends, moving the blades (2a, 2b) as shown in FIG. 6 of Koeppl. In FIG. 7 of Koeppl there is shown a stationary upper blade and movable lower blades 1a and 1b. In FIG. 8 of Koppl there is illustrated split upper and lower blades all of which are movable. A problem with split blades of this type is that there is a space between the blades in which the stationary blade alone meets some of the crop material, or even if all of the blades are movable there is no shearing action in the place where there is just one of the blades encountering the crop material.

What is needed in the art is a cost effective and efficient way of using a split blade system without having a portion of the crop encountering a blade that has no cutting/shearing action.

SUMMARY OF THE INVENTION

In accordance with an aspect of the present invention, there is provided a multi-knife section cutter bar arrangement for a header of a combine.

In accordance with another aspect of the present invention, there is provided a header for an agricultural harvester including a cutter bar that cuts crop material and includes a stationary knife section and a plurality of reciprocating knife sections extending along a portion of the stationary knife section. A substantial part of the length of the reciprocating knife sections does not extend along any portion of the stationary knife section. Advantageously, there is a lack of a non-shearing area between split reciprocating blades.

The crop material that encounters the cutter bar of the exemplary aspects of the present invention is advantageously cut by a shearing action even where there may be a gap between horizontally adjacent blades.

Another advantage is that the horizontally adjacent blades have a minimum spacing therebetween so that they do not hit each other as they reciprocate in opposite directions.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
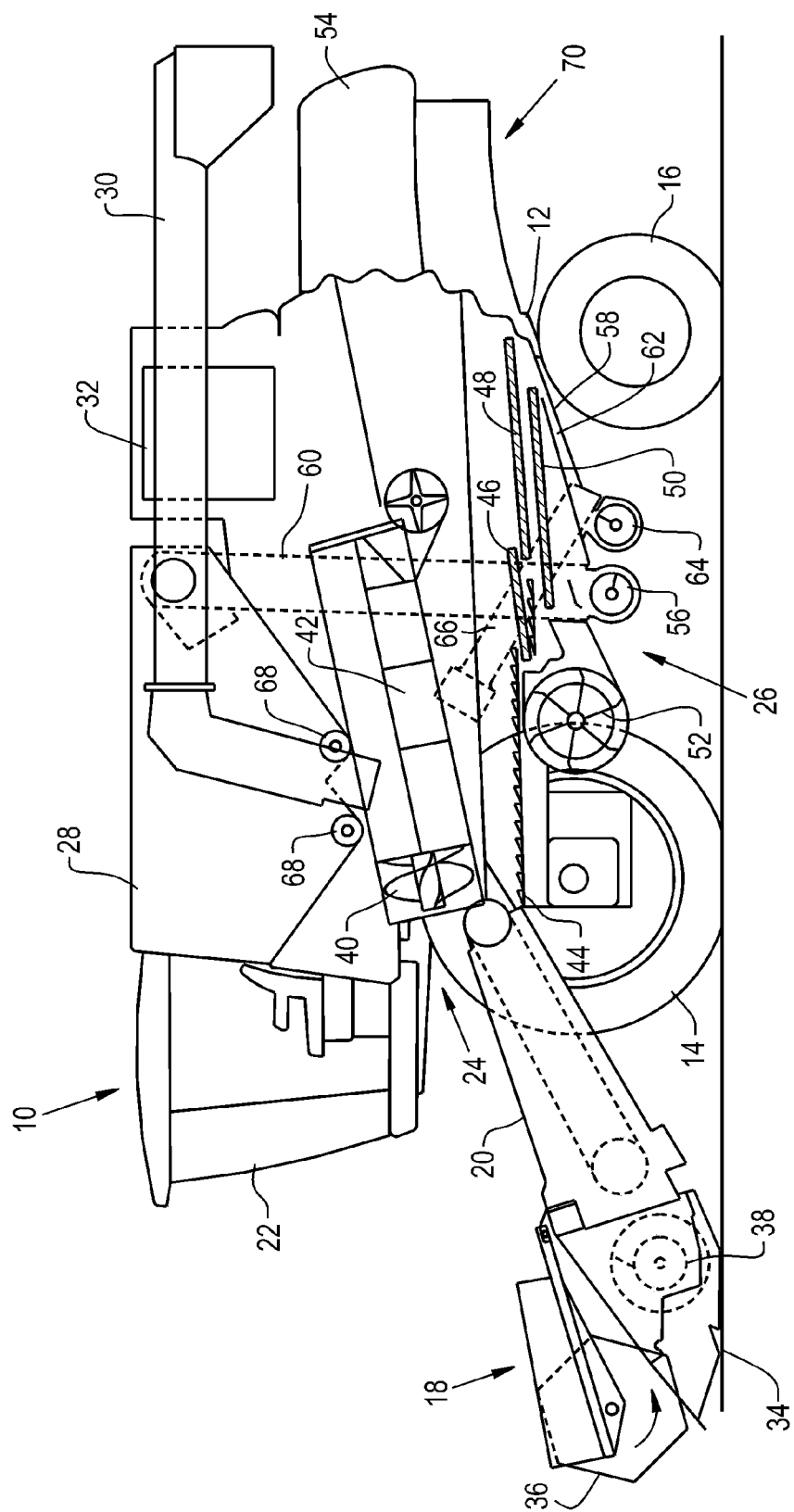
FIG. 1 is a side view of an embodiment of an agricultural harvester in the form of a combine that uses a multi-knife section cutter bar, in accordance with an exemplary embodiment of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing and separating system 24, a cleaning system 26, a grain tank 28, and an unloading conveyance 30, in accordance with an exemplary embodiment of the present invention. Unloading conveyor 30 is illustrated as an unloading auger, but can also be configured as a belt conveyor, chain elevator, etc.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half-tracks.

The header 18 is mounted to the front of the combine 10 and includes a cutter bar 34 for severing crops from a field during forward motion of the combine 10. A rotatable reel 36 feeds the crop into the header 18, and an auger 38 feeds the severed crop laterally inwardly from each side toward the feeder housing 20. The feeder housing 20 conveys the cut crop to the threshing and separating system 24, and is selectively vertically movable using appropriate actuators, such as hydraulic cylinders (not shown).

The threshing and separating system 24 is of the axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Although the threshing and separating system 24 is illustrated as being of an axial-flow type having a rotor, other threshing systems are contemplated.

Grain, which has been separated by the threshing and separating assembly 24, falls onto a grain pan 44 and is conveyed toward the cleaning system 26. The cleaning system 26 may include an optional pre-cleaning sieve 46, an upper sieve 48 (also known as a chaffer sieve), a lower sieve 50 (also known as a cleaning sieve), and a cleaning fan 52. Grain on the sieves 46, 48 and 50 is subjected to a cleaning action by the fan 52 which provides an airflow through the sieves to remove chaff and other impurities such as dust from the grain by making this material airborne for discharge from the straw hood 54 of the combine 10. The grain pan 44 and the pre-cleaning sieve 46 oscillate in a fore-to-aft manner to transport the grain and finer non-grain crop material to the upper surface of the upper sieve 48. The upper sieve 48 and the lower sieve 50 are vertically arranged relative to each other, and likewise oscillate in a fore-to-aft manner to spread the grain across the sieves 48, 50, while permitting the passage of cleaned grain by gravity through the openings of the sieves 48, 50.

Clean grain falls to a clean grain auger 56 positioned crosswise below and in front of the lower sieve 50. The clean grain auger 56 receives clean grain from each sieve 48, 50 and from the bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough 62. The tailings are transported via the tailings auger 64 and the return auger 66 to the upstream end of the cleaning system 26 for repeated cleaning action. The cross augers 68 at the bottom of the grain tank 28 convey the clean grain within the grain tank 28 to the unloading auger 30 for discharge from the combine 10.

The non-grain crop material proceeds through a residue handling system 70. The residue handling system 70 may include a chopper, counter knives, a windrow door and a residue spreader.

Figure 2:
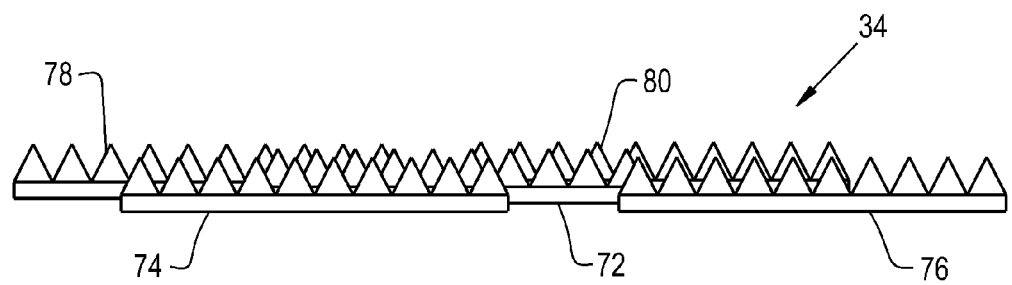
FIG. 2 is a somewhat schematized top view of an embodiment of the multi-knife system used in the combine of FIG. 1, in accordance with an exemplary embodiment of the present invention.

Now, additionally referring to FIG. 2 there is shown and illustrated, in a schematic form, a top view of the cutter bar 34, in accordance with an exemplary embodiment of the present invention. Even though cutter bar 34 is illustrated as being used with a harvester 10, its use is not limited to use with only the harvester 10. Further, the position of the cutter bar 34 is not limited to where it is shown. For example, a second cutter bar can be coupled to the header, such as that disclosed in WO 2013/011138, where a cutter bar is positioned aft of the header and cuts the residual crop material at a lower level than the front cutter bar. The cutter bar 34 includes a stationary knife section 72 and four reciprocating knife sections 74, 76, 78 and 80. The sections are shown slightly offset so that the differing sections can be more readily seen, and it is to be understood that the sections are effectively positioned to operate with the sections aligned.

The reciprocating knife sections 74, 76, 78 and 80 are substantially longer than the stationary knife section 72, with the reciprocating knife sections 74, 76, 78 and 80 extending to opposite respective ends of the header 18. Although the stationary knife section 72 may be generally centrally positioned relative to the width of the header 18, it is also contemplated that the stationary knife section 72 may be located at differing positions along the length of the cutter bar 34. The stationary knife section 72 has relatively few cutting blades as compared to the reciprocating knife sections 74, 76, 78 and 80. Most of the length of the reciprocating knife sections 74, 76, 78 and 80, or in other words substantially all of the reciprocating knife sections 74, 76, 78 and 80, is not proximate to the stationary knife section 72. The figures do not show the entire length of the reciprocating knife sections 74, 76, 78 and 80, for the sake of clarity and to focus on the interaction of the reciprocating knife sections 74, 76, 78 and 80 with the stationary knife section 72. The part of the length of the reciprocating knife sections 74, 76, 78 and 80, not lying along any portion of the stationary knife section 72 is at least 90% or even 95% of the total length of the reciprocating knife sections 74, 76, 78 and 80.

Figure 3:
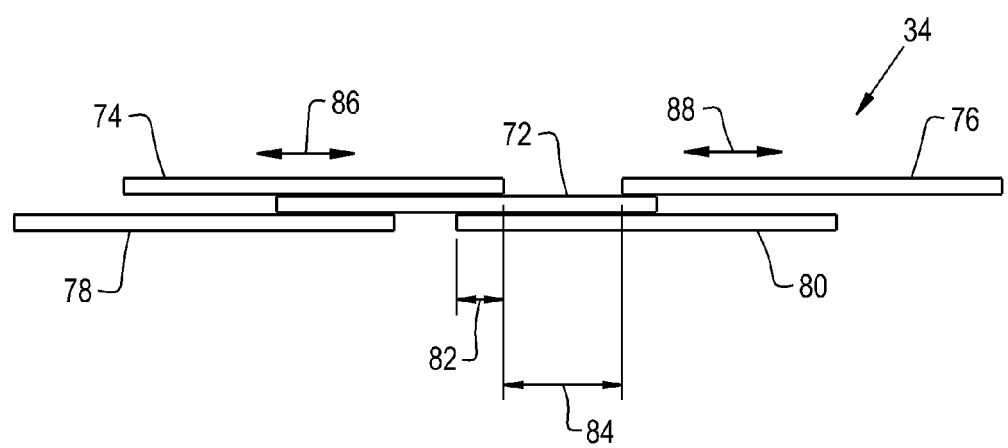
FIG. 3 is a schematized front view of the multi-knife system of FIG. 2 used in the combine of FIG. 1, in accordance with an exemplary embodiment of the present invention.

Now, additionally referring to FIG. 3 there is shown a front view of the cutter bar 34 (or a cutter bar that could be positioned elsewhere), again in a schematic form, with no cutting blades shown on the sections, but showing aspects of how the reciprocating knife sections 74, 76, 78 and 80 relate to the stationary knife section 72, and to each other. The reciprocating knife sections 74 and 76 are horizontally adjacent and reciprocate along the top of the stationary knife section 72 in opposite directions. In a similar manner, the reciprocating knife sections 78 and 80 are horizontally adjacent and reciprocate along the bottom of the stationary knife section 72, in opposing directions.

The reciprocating knife sections 74 and 80 are arranged to always have a minimum overlap 82 as they reciprocate. The minimum overlap can be considered to be the width of one cutting blade. Also, there is a minimum distance 84 between the reciprocating knife sections 74 and 76 (and similarly between 78 and 80) as they reciprocate. The minimum distance 84 can vary depending upon the stroke relationship, if the strokes are opposite of each other, then the minimum distance can be essentially zero as they could just touch each other as they approach each other and as they change direction to then be separated at the sum of their individual strokes. The minimum distance 84 is a way of saying that the knife sections 74 and 76 will not collide regardless of the timing of the movement of the knife sections 74 and 76. The reciprocating knife sections 74 and 80 move in a direction 86 in a generally coordinated manner, while the reciprocating knife sections 76 and 78 move in a direction 88 also in a generally coordinated manner, with directions 86 and 88 being in a generally opposite phase relationship. Although other phase relationships are also contemplated, where the directions 86 and 88 are not an opposite phase relationship and may even be a variable relationship with the directions 86 and 88 operating at different and variable relative frequencies.

Advantageously, the arrangement of the reciprocating knife sections 74, 76, 78 and 80 with the stationary knife section 72 is such that there is always presented a shearing action to the crop material even though there are gaps between the horizontally adjacent reciprocating knife sections 74 and 76; and 78 and 80. Also the stationary knife section 72 always has at least one of the plurality of reciprocating knife sections 74, 76, 78 and 80 either immediately above or immediately below the entire length of the stationary knife section 72, as can be seen in FIGS. 2 and 3.

The cutter bar 34 of the grain header 18 is an improvement over prior-art cutting systems. The prior-art cutting system for a grain header is a reciprocating knife blade. Depending on the width of the header one or more of these knife blades are used. The cutter bar 34 uses a Dual Knife (multiple reciprocating blades), and more particularly knife sections 74, 76, 78, and 80 that have some sections that overlap by making use of some fixed knife sections 72 in the center and then use the single cut principle. This single cut principle is then done one time above the fixed knife section and one time below the fixed knife section.

When using a double cutting knife (reciprocating knife sections at the top and the bottom, with no fixed knife in between) a standard knife overlap is no longer useable. This is because of the necessary timing of the 2 knives, it is impossible to make for example the left upper knife shorter and the right bottom knife shorter, and let the other knives overlap. This would result in a time period wherein no cutting action would occur because of the speed difference.

The cutter bar 34 therefore uses a split double cutting system within the center position, where the knives overlap a fixed knife section 72. This fixed knife section 72 assures that there is cutting action.

The entire header drive for the knives include two gearboxes or 'wobble-boxes'. One is driving the Left hand Knives 74 and 78 (in opposing directions) and the other one the Right Hand Knives 76 and 80 (also in opposing directions). The minimum overlap between one of the top knife section and one of the bottom knife sections in combination with the fixed knife section 72 is necessary to have a cutting action over the entire width. The reason there is a minimum distance between the two upper knifes 74 and 76 and the two bottom knives 78 and 80 is to be sure that if there is an error in the timing that the knifes will not crash into each other while moving. An error in the timing could occur, for example, when the teeth of the PTO shaft are shifted by one tooth, or if a non-timed protection clutch is used on the drive system, such as a slip clutch.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A header for use by an agricultural harvester, the header comprising:
 a cutter bar for cutting crop material encountered by the header, the cutter bar comprising:
  a stationary knife section;
  a plurality of reciprocating knife sections extending along a portion of the stationary knife section, the reciprocating knife sections each having a length, a substantial part of the length not extending along any portion of the stationary knife section; and wherein the plurality of reciprocating knife sections includes a first reciprocating knife section, a second reciprocating knife section, a third reciprocating knife section, and a fourth reciprocating knife section.

2. The header of claim 1, wherein the first reciprocating knife section and the second reciprocating knife section move atop the stationary knife section.

3. The header of claim 1, wherein the third reciprocating knife section and the fourth reciprocating knife section move beneath the stationary knife section.

4. The header of claim 1, wherein the first reciprocating knife section and the second reciprocating knife section generally move in opposite directions.

5. The header of claim 1, wherein the third reciprocating knife section and the fourth reciprocating knife section generally move in opposite directions.

6. The header of claim 1, wherein the first reciprocating knife section and the fourth reciprocating knife section generally move in the same direction.

7. The header of claim 1, wherein the second reciprocating knife section and the third reciprocating knife section generally move in the same direction.

8. The header of claim 1, wherein the first reciprocating knife section and the fourth reciprocating knife section overlap at least a minimum distance relative to each other.

9. The header of claim 1, wherein the second reciprocating knife section and the third reciprocating knife section never overlap each other.

10. The header of claim 1, wherein the first reciprocating knife section and the second reciprocating knife section are arranged to not collide.

11. The header of claim 1, wherein the stationary knife section always has at least one of the plurality of reciprocating knife sections either immediately above or immediately below an entire length of the stationary knife section.

12. The header of claim 1, wherein the substantial part of the length of each of the plurality of reciprocating knife sections not extending along any portion of the stationary knife section is at least 90% of the length of the each of the plurality of reciprocating knife sections.

13. The header of claim 1, wherein the substantial part of the length of each of the plurality of reciprocating knife sections not extending along any portion of the stationary knife section is at least 95% of the length of the each of the plurality of reciprocating knife sections.

14. A cutter bar for cutting crop material encountered by a header of an agricultural harvester, the cutter bar comprising:

a stationary knife section;

a plurality of reciprocating knife sections extending along a portion of the stationary knife section, the reciprocating knife sections each having a length, a substantial part of the length not extending along any portion of the stationary knife section; and wherein the plurality of reciprocating knife sections includes a first reciprocating knife section, a second reciprocating knife section, a third reciprocating knife section, and a fourth reciprocating knife section.

15. The cutter bar of claim 14, wherein the first reciprocating knife section and the second reciprocating knife section move atop the stationary knife section.

16. The cutter bar of claim 14, wherein the third reciprocating knife section and the fourth reciprocating knife section move beneath the stationary knife section.

17. The cutter bar of claim 14, wherein the first reciprocating knife section and the second reciprocating knife section generally move in opposite directions.

18. The cutter bar of claim 14, wherein the third reciprocating knife section and the fourth reciprocating knife section generally move in opposite directions.

19. The cutter bar of claim 14, wherein the first reciprocating knife section and the fourth reciprocating knife section generally move in the same direction.

20. The cutter bar of claim 14, wherein the second reciprocating knife section and the third reciprocating knife section generally move in the same direction.

21. The cutter bar of claim 14, wherein the first reciprocating knife section and the fourth reciprocating knife section overlap at least a minimum distance relative to each other.

22. The cutter bar of claim 14, wherein the second reciprocating knife section and the third reciprocating knife section never overlap each other.

23. The cutter bar of claim 14, wherein the first reciprocating knife section and the second reciprocating knife section are arrange to not collide.

* * * * *